United States Patent
Agiwal et al.

(10) Patent No.: US 10,142,769 B2
(45) Date of Patent: Nov. 27, 2018

(54) METHOD AND SYSTEM FOR ESTABLISHING A SECURE COMMUNICATION BETWEEN REMOTE UE AND RELAY UE IN A DEVICE TO DEVICE COMMUNICATION NETWORK

(71) Applicant: Samsung Electronics Co., Ltd., Suwon-si, Gyeonggi-do (KR)

(72) Inventors: Anil Agiwal, Bangalore (IN); Rajavelsamy Rajadurai, Bangalore (IN); Youngbin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 193 days.

(21) Appl. No.: 14/994,656

(22) Filed: Jan. 13, 2016

(65) Prior Publication Data

US 2016/0205555 A1 Jul. 14, 2016

(30) Foreign Application Priority Data

Jan. 14, 2015 (IN) .............................. 226/CHE/2015

(51) Int. Cl.
*H04W 12/02* (2009.01)
*H04W 12/04* (2009.01)
(Continued)

(52) U.S. Cl.
CPC .............. *H04W 4/02* (2013.01); *H04W 12/04* (2013.01); *H04L 63/0428* (2013.01);
(Continued)

(58) Field of Classification Search
CPC ........... H04L 2463/061; H04L 63/0428; H04L 29/06; H04W 12/02; H04W 12/04;
(Continued)

(56) References Cited

U.S. PATENT DOCUMENTS

2011/0038480 A1* 2/2011 Lin ....................... H04W 12/04
380/270
2011/0305339 A1* 12/2011 Norrman ............... H04W 12/04
380/270
(Continued)

OTHER PUBLICATIONS

3rd Generation Partnership Project; Technical Specification Group Services and System Aspects; Proximity-Based Services (ProSe); Security Aspects (Release 12), 3GPP TS 33.303, Sep. 2014, pp. 1-48, V12.1.0, 3GPP, Valbonne, France.
(Continued)

*Primary Examiner* — Jayesh M Jhaveri
(74) *Attorney, Agent, or Firm* — Jefferson IP Law, LLP

(57) ABSTRACT

The present disclosure relates to a communication method and system for converging a 5G communication system for supporting higher data rates beyond a 4G system with a technology for Internet of Things (IoT). A method for establishing a secure communication between a UE and a relay UE is provided. The method includes deriving a ProSe traffic key (PTK) of the relay UE by using a key derivation function (KDF) of at least one of a ProSe group key (PGK) of the UE, a PTK identification (ID) and a ID of the relay UE, and transmitting a security key response message comprising at least the PTK of the relay UE, the PTK ID and PGK ID, to the relay UE. The at least the PTK of relay UE. PTK ID and PGK is used to derive a security key for the D2D group communication between the UE and relay UE.

26 Claims, 7 Drawing Sheets

(51) Int. Cl.
  *H04W 12/06* (2009.01)
  *H04W 12/08* (2009.01)
  *H04W 76/10* (2018.01)
  *H04W 76/14* (2018.01)
  *H04L 29/06* (2006.01)
  *H04W 4/02* (2018.01)

(52) U.S. Cl.
  CPC ............ *H04W 12/02* (2013.01); *H04W 12/06* (2013.01); *H04W 12/08* (2013.01); *H04W 76/10* (2018.02); *H04W 76/14* (2018.02)

(58) Field of Classification Search
  CPC ....... H04W 12/06; H04W 12/08; H04W 4/02; H04W 76/10; H04W 76/14
  See application file for complete search history.

(56) References Cited

U.S. PATENT DOCUMENTS

| | | | | |
|---|---|---|---|---|
| 2012/0008776 | A1* | 1/2012 | Ishida | H04W 12/04 380/247 |
| 2012/0039472 | A1* | 2/2012 | Liu | H04W 12/04 380/270 |
| 2012/0178417 | A1* | 7/2012 | Hapsari | H04W 12/04 455/411 |
| 2013/0324114 | A1 | 12/2013 | Raghothaman et al. | |
| 2015/0382159 | A1* | 12/2015 | Kim | H04W 4/08 370/312 |
| 2016/0057622 | A1* | 2/2016 | Koshimizu | H04W 12/04 713/168 |

OTHER PUBLICATIONS

Ericsson, Updates to Solution #3.6 ProSe One-to-Many Communication, 3GPP TSG SA WG3 (Security) Meeting #75, Agenda Item 7.11 ProSe, Sapporo, Japan, May 12-16, 2014, S3-140981.

Qualcomm Incorporated, Using a Single Group Key and Bearer Level Security for ProSe One-to-Many Communication, 3GPP TSG SA WG3 (Security) Meeting #74, Agenda Item 7.13, Taipei (Taiwan), Jan. 20-24, 2014, S3-140136.

Qualcomm Incorporated, Adding Solution #3.6 to the ProSe TS, 3GPP TSG SA WG3 (Security) Meeting #75, Agenda Item 7.11, Sapporo (Japan), May 12-16, 2014, S3-140987.

* cited by examiner

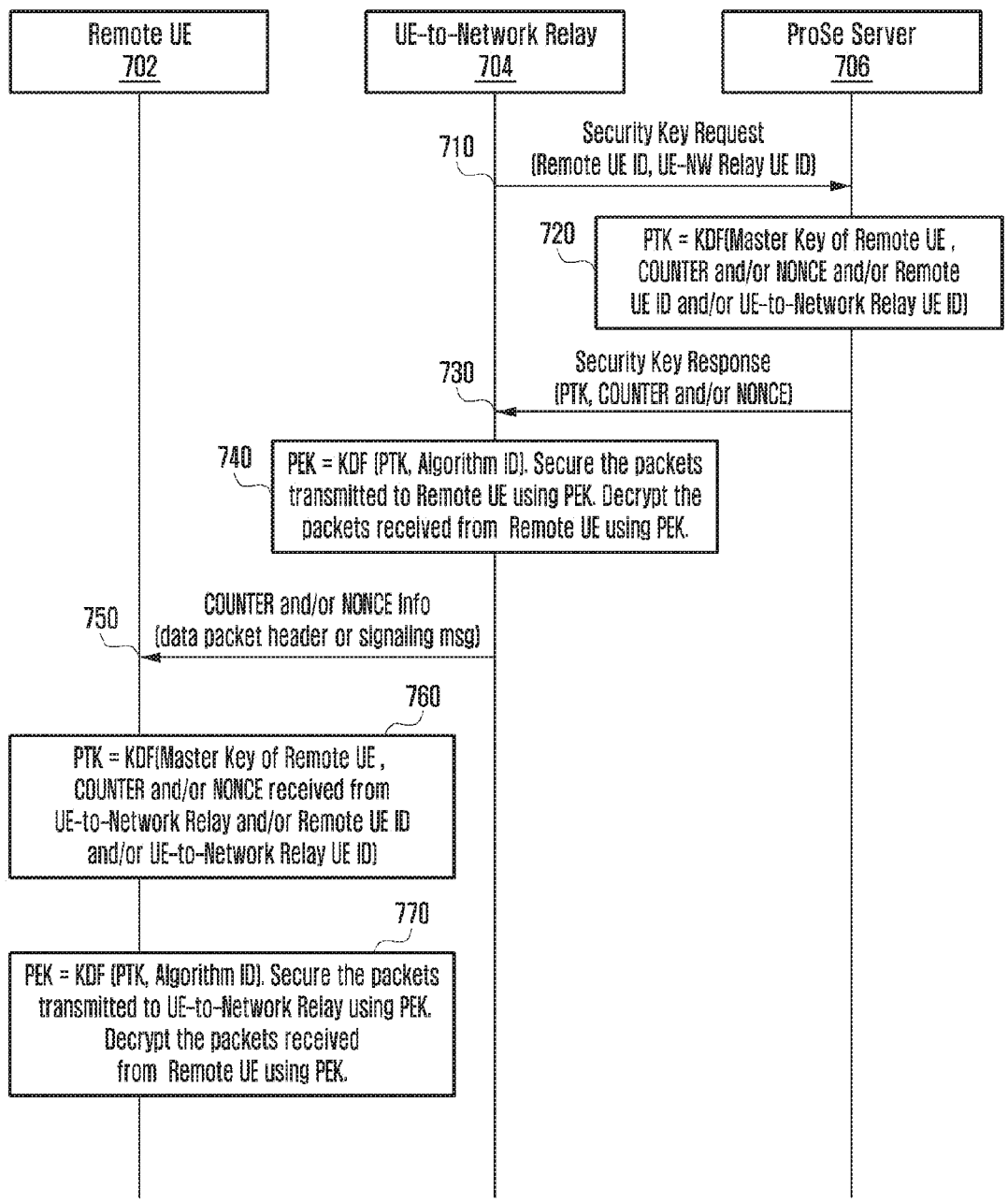

METHOD AND SYSTEM FOR ESTABLISHING A SECURE COMMUNICATION BETWEEN REMOTE UE AND RELAY UE IN A DEVICE TO DEVICE COMMUNICATION NETWORK

CROSS-REFERENCE TO RELATED APPLICATION(S)

This application claims the benefit under 35 U.S.C. § 119(a) of an Indian Provisional application filed on Jan. 14, 2015 in the Indian Patent Office and assigned Serial number 226/CUE/2015, and under 35 U.S.C. § 119(a) of an Indian patent application filed on Dec. 8, 2015 in the Indian Patent Office and assigned Serial number 26/CUE/2015, the entire disclosure of each of which is hereby incorporated by reference.

TECHNICAL FIELD

The present disclosure relates to device-to-device (D2D) communications (proximity services). More particularly, the present disclosure relates to method and system for establishing a secure communication between remote user equipment (UE) and relay UE in a D2D communication network.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Device-to-device (D2D) communication is being studied in communication standard groups to enable data communication services between a plurality of user equipment (UEs). During the D2D communication a transmitting D2D UE may transmit data packets to a group of D2D UEs or broadcast data packets to all the D2D UEs. The D2D communication between the transmitter and receiver(s) are connectionless in nature (i.e., there is no connection setup between the transmitter and receiver before the transmitter starts transmitting the data packets). During the transmission, the transmitter includes the source identification (ID) and the destination ID in the data packets. The source ID is set to the UE ID of the transmitter. The destination ID is the broadcast ID or group ID or UE ID of an intended recipient of the transmitted packet.

One of the requirements of D2D communication is that a UE in out of coverage of a network should be able to communicate with the network via another UE (i.e., UE-to-network relay which is in coverage of network and is in proximity of a remote UE. This is illustrated in FIG. 1.

FIG. 1 is a flow diagram illustrating a D2D communication between a remote UE and a UE-to-network relay according to the related art.

Referring to FIG. 1, communication between a remote UE and a UE-to-network relay includes a remote UE 102, UE-to-network relay 104, an e node B (eNB) 106, an evolved packet core (EPC) 108 and a public safety server 110. The remote UE 102 communicates with the UE-to-network relay 104 using D2D communication. Further requirements of the D2D communication is that UEs out of proximity with each other should be able to communicate via another UE (i.e., UE-to-UE relay) which is in proximity to both UEs.

In order to support the security for the D2D communication a proximity-based service (ProSe) group key (PGK) is defined. The PGK is specific to a group of D2D UEs. Multiple PGKs per group may be pre-provisioned in the UE. Each of these PGKs for a same group is identified using a PGK ID (usually, 8 bits in size). Each PGK also has an expiry time associated with the PKG. If the UE wants to send data packets to a group, then the UE derives a ProSe traffic key (PTK) from the PGK corresponding to that group. The PTK is identified using PTK ID. The PTK is a group member specific key generated from the PGK. Each PTK is also associated with a PTK ID counter (usually, 16 bits in size). For encrypting data the combination of <PTK, packet data convergence protocol (PDCP) counter> is unique. The PDCP counter is updated for every packet transmitted. If the PDCP counter rolls over, then a new PTK is generated from the PGK. PTK=key derivation function (KDF) (PGK, PTK ID, group member identity of transmitter). A ProSe encryption key (PEK) is also generated whenever PTK is generated. PEK=KDF (PTK, algorithm ID). Algorithm ID identifies the security algorithm, for example, SNOW third generation (3G) integrity algorithms or advanced encryption standard (AES) encryption algorithm, like so. The key hierarchy is illustrated in FIG. 2.

FIG. 2 is a flow diagram illustrating a key hierarchy for D2D group communication according to the related art.

Referring to FIG. 2, a PGK ID, a PTK ID and a PDCP counter value are transmitted along with a data packet. The PTK ID, the PGK ID and the PDCP counter value are included by the transmitter along with the secured data packet. The receiver generates the PTK used by transmitter using the PTK ID, the PGK ID and a destination ID (identifying the group) received along with the packet for decryption.

During the group communication the security key (i.e., PGK) is already known to both the transmitter and receiver(s). In case of communication between remote UE 102 and UE-to-network relay 104 wherein the remote UE and UE-to-network relay belong to different groups, then a different security key (i.e., PGK) is available at the remote UE 102 and the UE-to-network relay 104. So communication between the remote UE 102 and the UE-to-network relay 104 cannot be secured. In other words, the UE-to-network relay 104 may not belong to all/any of the groups (formed by the network (e.g. ProSe function)), which implies, the UE-to-network relay 104 may not have all the group keys to secure or decrypt the packets to be relayed. Further, the UE-to-network relay 104 which belongs to a specific group(s) may need to take the role/functionality of relaying packets securely to all other (or specific) group members (e.g., for mission critical communication, only one UE-to-network relay 104 is in coverage of network).

Thus, there is a need for a method and system for securing communication between remote UE and UE-to-network relay.

The above information is presented as background information only to assist with an understanding of the present disclosure. No determination has been made, and no assertion is made, as to whether any of the above might be applicable as prior art with regard to the present disclosure.

SUMMARY OF THE DISCLOSURE

Aspects of the present disclosure are to address at least the above-mentioned problems and/or disadvantages and to provide at least the advantages described below. Accordingly, an aspect of the present disclosure is to provide a method and system for establishing a secure communication between a remote user equipment (UE) and UE-to-network relay in a device-to-device (D2D) group communication.

In accordance with an aspect of the present disclosure, method by a proximity-based service (ProSe) key management function (PKMF) for establishing a secure communication between a remote-user equipment (UE) and a UE-to-network relay that belongs to a different group than the remote-UE in a device-to-device (D2D) group communication is provided. The method including deriving a ProSe traffic key (PTK) of the UE-to-network relay by using a key derivation function (KDF) of at least one of a ProSe group key (PGK) of the remote-UE, a PTK identification (ID) and a UE ID of the UE-to-network relay, and transmitting a security key response message comprising at least one of the PTK of the UE-to-network relay, the PTK ID and the PGK ID, to the UE-to-network relay. The at least one of the PTK of the UE-to-network relay, the PTK ID and the PGK ID is used to derive a security key for the D2D group communication between the remote-UE and the UE-to-network relay.

In accordance with an aspect of the present disclosure, a method by an user equipment (UE)-to-network relay for establishing a secure communication between a remote-UE and the UE-to-network relay that belongs to a different group than the remote-UE in a device-to-device (D2D) group communication is provided. The method includes receiving a security key response message comprising at least one of a proximity-based service (ProSe) traffic key (PTK) of the UE-to-network relay, a PTK identification (ID) and a ProSe group key (PGK) ID, from the a ProSe key management function (PKMF), generating a ProSe encryption key (PEK) of the UE-to-network relay based on the PTK of the UE-to-network, transmitting, an authentication request message comprising the PGK ID and the PTK ID, to the remote-UE, and securing packets for transmitting to the remote-UE using the PEK of the UE-to-network relay.

In accordance with an aspect of the present disclosure, a method by a remote-user equipment (UE) for establishing a secure communication between a remote-UE and a UE-to-network relay that belongs to a different group than the remote-UE in a device-to-device (D2D) group communication is provided. The method includes receiving, an authentication request message comprising a proximity-based service (ProSe) group key (PGK) identification (ID) and a ProSe traffic key (PTK) ID, from the remote-UE, deriving the PTK of the remote-UE from a key derivation function (KDF) of at least one of the PGK corresponding to the PGK ID and the group ID of the remote-UE, and the PTK ID, ID of UE-to-network relay, and deriving a ProSe encryption key (PEK) of the remote-UE from the KDF of at least one of the PTK of the remote-UE and an algorithm ID.

In accordance with an aspect of the present disclosure, a proximity-based service (ProSe) key management function (PKMF) for establishing a secure communication between a remote-user equipment (UE) and a UE-to-network relay that belongs to a different group than the remote-UE in a device-to-device (D2D) group communication is provided. The PKMF includes a transceiver configured to transmit and receive signals, and a controller configured to derive ProSe traffic key (PTK) of the UE-to-network relay by using key derivation function (KDF) of at least one of a ProSe group key (PGK) of the remote-UE, a PTK identification (ID) and a UE ID of the UE-to-network relay, and transmit a security key response message comprising at least one of the PTK of the UE-to-network relay, the PTK ID and PGK ID, to the UE-to-network relay. The at least one of the PTK of the UE-to-network relay, the PTK ID and the PGK ID are used to derive security key for the D2D group communication between the remote-UE and the UE-to-network relay.

In accordance with an aspect of the present disclosure, user equipment (UE)-to-network relay for establishing a secure communication between a remote-UE and the UE-to-network relay that belongs to a different group than the remote-UE in a device-to-device (D2D) group communication is provided. The UE-to-network relay includes a transceiver configured to transmit and receive signals, and a controller configured to receive a security key response message comprising at least one of a proximity-based service (ProSe) traffic key (PTK) of the UE-to-network relay, a PTK identification (ID) and a ProSe group key (PGK) ID, from the ProSe key management function (PKMF), generate a ProSe encryption key (PEK) of the UE-to-network relay based on the PTK of the UE-to-network, transmit an authentication request message comprising the PGK ID and the PTK ID to the remote-UE, and secure packets for transmitting to the remote-UE using the PEK of the UE-to-network relay.

In accordance with an aspect of the present disclosure, remote-user equipment (UE) for establishing a secure communication between a remote-UE and a UE-to-network relay that belongs to a different group than the remote-UE in a device-to-device (D2D) group communication is provided. The remote-UE includes a transceiver configured to transmit and receive signals, and a controller configured to receive an authentication request message comprising a proximity-based service (ProSe) group key (PGK) identification (ID) and a ProSe traffic key (PTK) ID, from the remote-UE, derive PTK of the remote-UE from a key derivation function (KDF) of at least one of the PGK corresponding to the PGK ID and a group ID of the remote-UE, the PTK ID, an ID of UE-to-network relay, and derive a ProSe encryption key (PEK) of the remote-UE from a key derivation function (KDF) of at least one of the PTK of the remote-UE and algorithm ID.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 7 is a flow diagram illustrating a method for establishing a secure communication between remote UE and UE-to-network relay according to an embodiment of the present disclosure.

Throughout the drawings, like reference numerals will be understood to refer to like parts, components, and structures.

DETAILED DESCRIPTION

Figure 1:
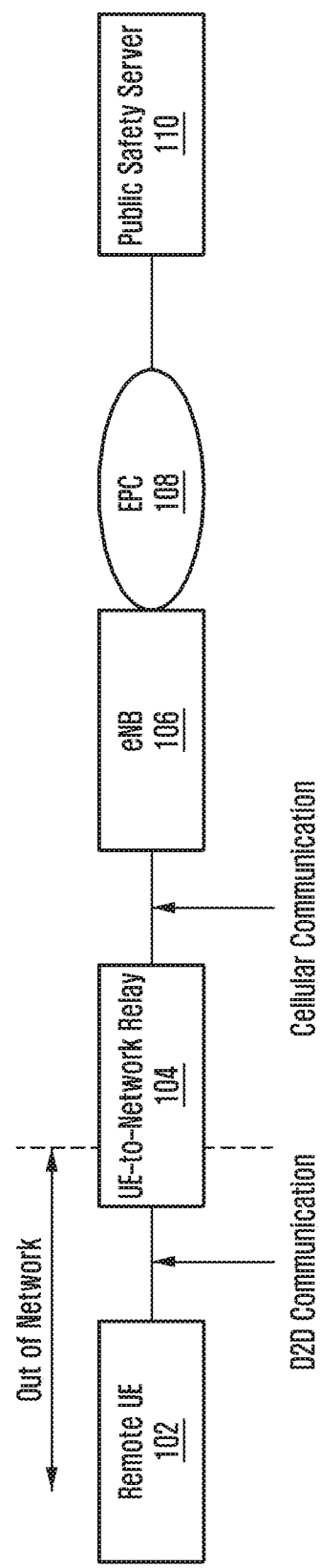
FIG. 1 is a flow diagram illustrating a device-to-device (D2D) communication between a remote user equipment (UE) and a UE-to-network relay according to the related art.
Figure 2:
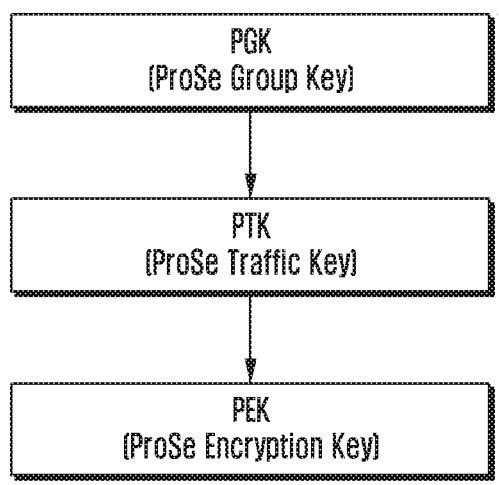
FIG. 2 is a flow diagram illustrating a key hierarchy for D2D group communication according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure provides a method and system for establishing a secure communication between a remote user equipment (UE) and UE-to-network relay in a device to device (D2D) communication network.

It will be further understood that the terms "includes", "comprises", "including" and/or "comprising" when used in this specification, specify the presence of stated features, integers, operations, elements and/or components, but do not preclude the presence or addition of one or more other features integers, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Throughout the specification, the terms UE-to-network relay and relay UE are interchangeably used. Throughout the specification, the terms remote UE and UE are interchangeably used. Throughout this specification, the message between the remote UE and the UE-to-network relay and the message between the UE-to-network relay and the proximity-based service (ProSe) function may be ProSe protocol specific messages. Further, throughout the specification, the terms server, ProSe server, network node, network entity and ProSe key management function (PKMF) are interchangeably used. For each of the server, the relay UE and the UE, a control unit (at least one processor) controls overall states and operations of the components of the apparatus. For example, the control unit may control a storage unit to store information received through a transceiver.

Figure 3:
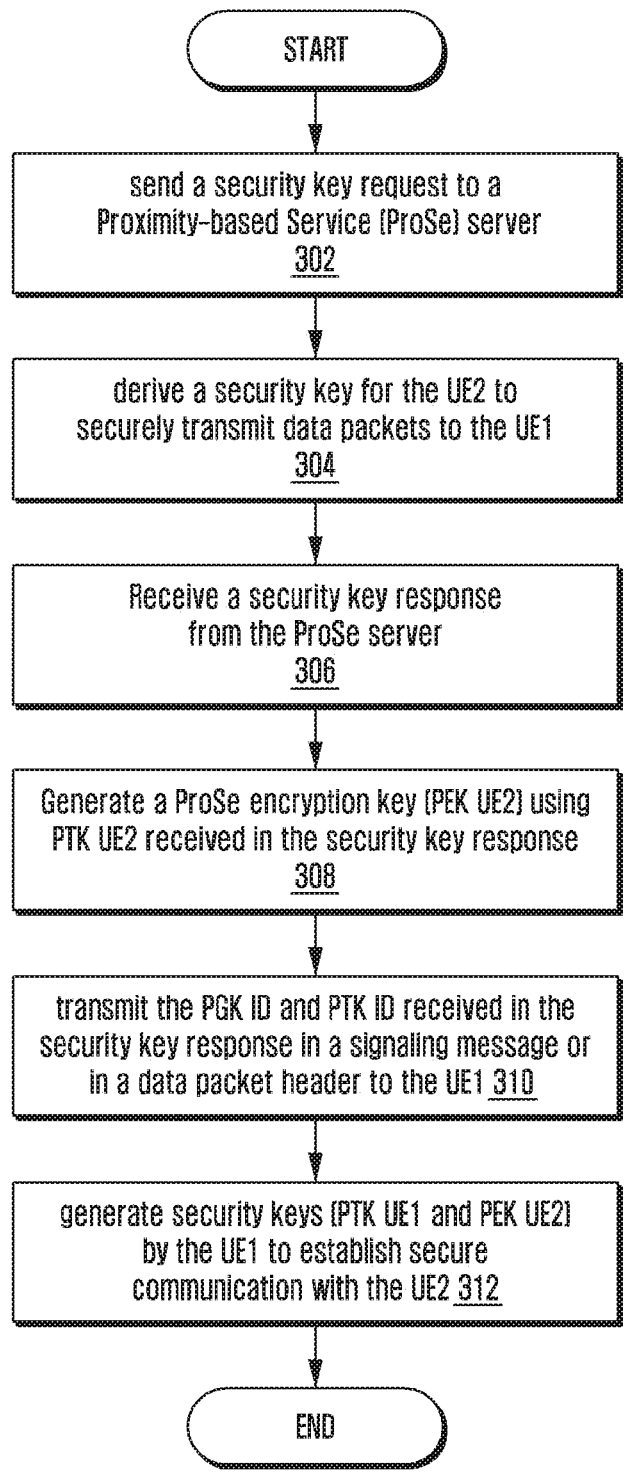
FIG. 3 is a flowchart illustrating a method for establishing a secure communication between first UE and second UE according to an embodiment of the present disclosure.

FIG. 3 is a flowchart illustrating a method for establishing a secure communication between a first UT and a second UE according to an embodiment of the present disclosure.

Referring to FIG. 3, in this embodiment, a first user equipment (UE1) communicates with network via a second user equipment (UE2).

In operation 302, a security key request is sent to a ProSe server or the PKMF by the UE2. The security key request comprises a UE1 ID and a UE2 ID. In operation 304, a security key, called ProSe traffic key (PTK UE2), is derived by the ProSe server or the PKMF for the UE2 to securely transmit data packets to the UE1. In operation 306, the security key response including PTK is received by the UE2. In operation 308, a ProSe encryption key ($PEK_{UE2}$) is generated by UE2 using the $PTK_{UE2}$ received in the security key response. The generated $PEK_{UE2}$ and ProSe group key (PGK) identification (ID) associated with the UE2 is then transmitted to the UE1 signaling message or in a data packet header in operation 310. In operation 312, security keys ($PTK_{UE1}$ and $PEK_{UE1}$) are generated by the UE1 to establish secure communication with the UE2.

Figure 4:
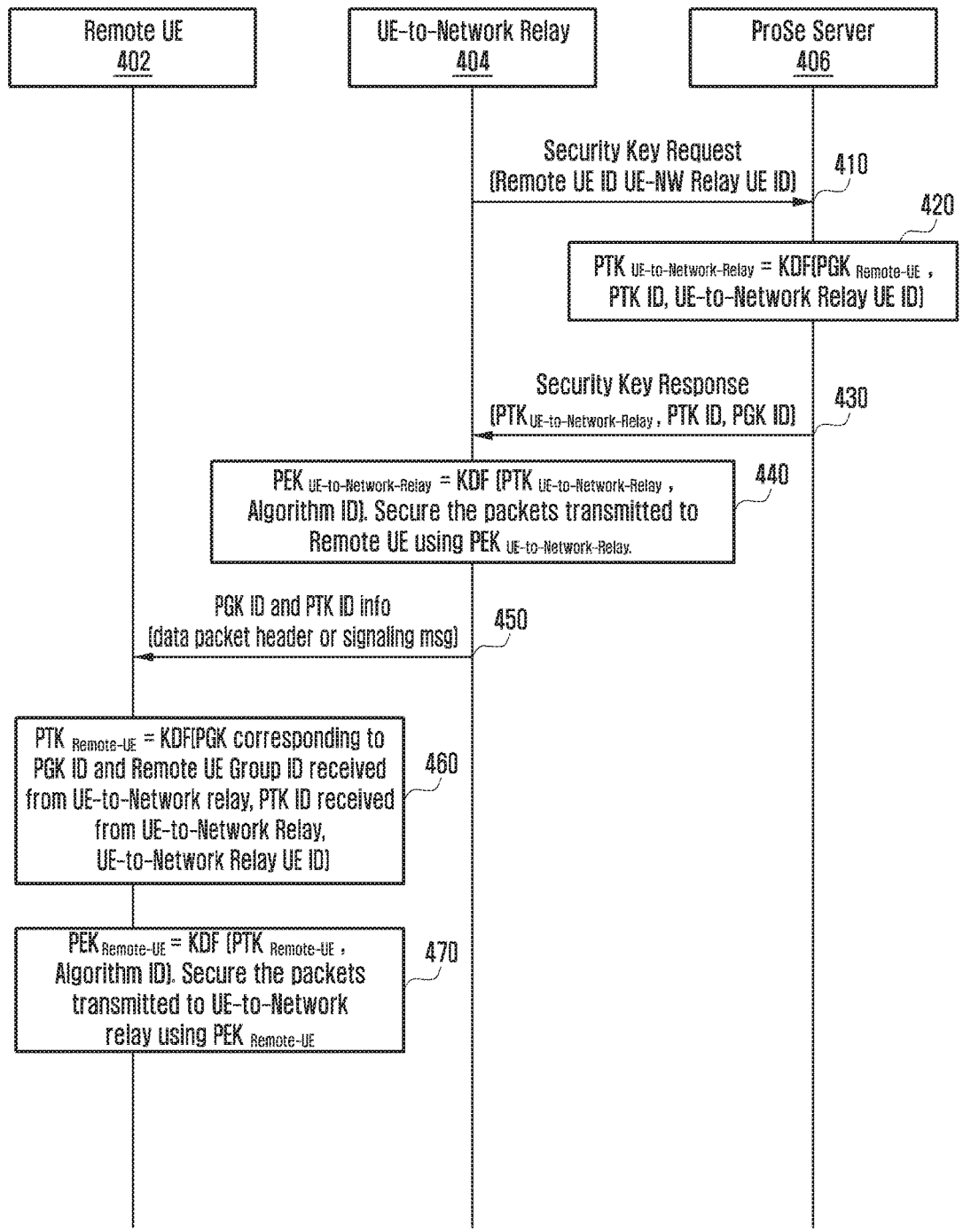
FIG. 4 is a flow diagram illustrating a method for establishing a secure communication between remote UE and UE-to-network relay according to an embodiment of the present disclosure.

FIG. 4 is a flow diagram illustrating a method for establishing a secure communication between a remote UE and a UT-to-network relay according to an embodiment of the present disclosure.

Referring to FIG. 4, in an embodiment, a UE-to-network relay 404 transmits a security key request to a ProSe server 406 or the PKMF in operation 410. The security key request comprises a remote UE ID and a UE-to-network relay's UE ID. The security key request may also comprise a group ID of a remote UE 402. In various embodiments, a remote UE group ID may be included in the security key request if the remote UE 402 belongs to multiple groups. In various embodiments, the remote UE group ID may also be included in the security key request if the remote UE ID is unique within the group. In these embodiments, if the remote UE ID is unique within the group, then the remote UE ID and the remote UE group ID together identify the remote UE 402. The UE-to-network relay 404 obtains the remote UE 402 ID and/or remote UE 402 group ID of the remote UE 402 during the UE-to-network relay discovery process.

Alternately, the UE-to-network relay 404 may receive the remote UE ID and/or remote UE group ID of the remote UE 402 from the remote UE 402 in the communication or connection request message. The UE-to-network relay 404 may transmit a security key request to the ProSe server 406 or the PKMF upon receiving the communication or connection request message from the remote UE 402.

In response to the security key request, the ProSe server 406 or the PKMF derives the security key ($PTK_{UE-to-network-relay}$), a PTK for the UE-to-network relay 404 to secure data packets transmitted to the remote UE 402 or to the remote UE's group. The ProSe server 406 or the PKMF, in operation 420, derives the security key as follows:

$PTK_{UE-to-network-relay}$=key derivation function(KDF) ($PGK_{remote-UE}$,PTK ID,UE-to-network relay UE ID)

The $PGK_{remote-UE}$ is any valid PGK of the remote UE 402 if the remote UE 402 is associated with one group. The $PGK_{remote-UE}$ is any valid PGK of the remote UE 402 corresponding to the group identified by the remote UE group ID wherein the remote UE group ID is received by ProSe server 406 or the PKMF in security key request. The KDF is well known in the related art and hence not explained here.

In an embodiment, the ProSe server 406 or the PKMF may further derive a PEK for the UE-to-network relay ($PEK_{UE-to-network-relay}$) wherein the $PEK_{UE-to-network-relay}$ is derived as follows:

$PEK_{UE-to-network-relay}$=KDF($PTK_{UE-to-network-relay}$, algorithm ID).

wherein the algorithm ID identifies the security algorithm, for example, SNOW third generation (3G) integrity algorithm or advanced encryption standard (AES) encryption algorithm.

The ProSe server 406 or the PKMF transmits the security key response to the UE-to-network relay in operation 430. The security key response comprises the $PTK_{UE-to-network-relay}$, PTK ID and the PGK ID. The $PTK_{UE-to-network-relay}$ is the security key derived by the ProSe server 406 or the PKMF which is to be used by UE-to-network relay 404 to secure the packets transmitted to the remote UE 402. The PTK ID is the ID used as input to derive the $PTK_{UE-to-network-relay}$ and the PGK ID is the index of the $PGK_{remote-UE}$ used to derive the $PTK_{UE-to-network-relay}$. In an embodiment, the $PEK_{UE-to-network-relay}$ is included in the security key response instead of the $PTK_{UE-to-network-relay}$.

The UE-to-network relay 404, in operation 440, generates the $PEK_{UE-to-network-relay}$ using the $PTK_{UE-to-network-relay}$ received in the security key response from ProSe server 406 or the PKMF as follows:

$PEK_{UE-to-network-relay}$=KDF($PTK_{UE-to-network-relay}$, algorithm ID)

The $PEK_{UE-to-network-relay}$ is then used for transmitting the data packets to the remote UE 402. Alternatively, the ProSe server 406 or the PKMF transmits the $PEK_{UE-to-network-relay}$ in the security key response and the $PEK_{UE-to-network-relay}$ is used by UE-to-network relay 404 for securing the packets transmitted to remote UE 402. The $PEK_{UE-to-network-relay}$ is also used by UE-to-network relay 404 to decrypt the packets received from the remote UE 402. The UE-to-network relay 404 then informs the PGK ID and the PTK ID received in security key response to the remote UE 402 in a signaling message and/or in data packet header in operation 450. The UE-to-network relay 404 may also send a MAC-I along with the PGK ID and the PTK ID. For MAC-I, UE-to-network relay 404 may derive a security key $PTK_{UE-to-network-relay}$) as follows:

$PIK_{UE-to-network-relay}$=KDF($PTK_{UE-to-network-relay}$,algorithm ID).

The method to generate the MAC-I is well known in the related art and hence not explained here.

Upon receiving the security key from the UE-to-network relay 404, the remote UE 402 generates the security key (i.e., PTK) for securely transmitting data packets to the UE-to-network relay 404 in operations 460 and 470. The security key is derived as follows:

$PTK_{remote-UE}$=KDF (PGK corresponding to PGK ID and remote UE group ID received from UE-to-network relay, PTK ID received from UE-to-network relay, UE-to-network relay UE ID).

$PEK_{remote-UE}$=KDF($PEK_{remote-UE}$,algorithm ID).

The $PEK_{remote-UE}$ is used by the remote UE 402 for securing the packets transmitted to the UE-to-network relay 404. The $PEK_{remote-UE}$ is also used by the remote UE 402 for decrypting the packets received from the UE-to-network relay 404.

In an embodiment in which the MAC-I is included, the remote UE 402 verifies the MAC-I included by the UE-to-network relay 404 using the derived keys. For the MAC-I, the remote UE 402 may derive a security key $PIK_{remote\ UE}$=KDF ($PTK_{remote\ UE}$, algorithm ID).

After verification, the remote UE 402 sends a message to the UE-to-network relay 404 with the MAC-I. The UE-to-network relay 404 then verifies the MAC-I and accepts the connection with the remote UE 402.

In an embodiment, the remote UE ID may be used in place of the UE-to-network relay UE ID in deriving the $PTK_{UE-to-network-relay}$ and the $PTK_{remote-UE}$. In an embodiment, the remote UE ID may be used in addition to the UE-to-network relay UE ID in deriving the $PTK_{UE-to-network-relay}$ and the $PTK_{remote-UE}$.

Figure 5:
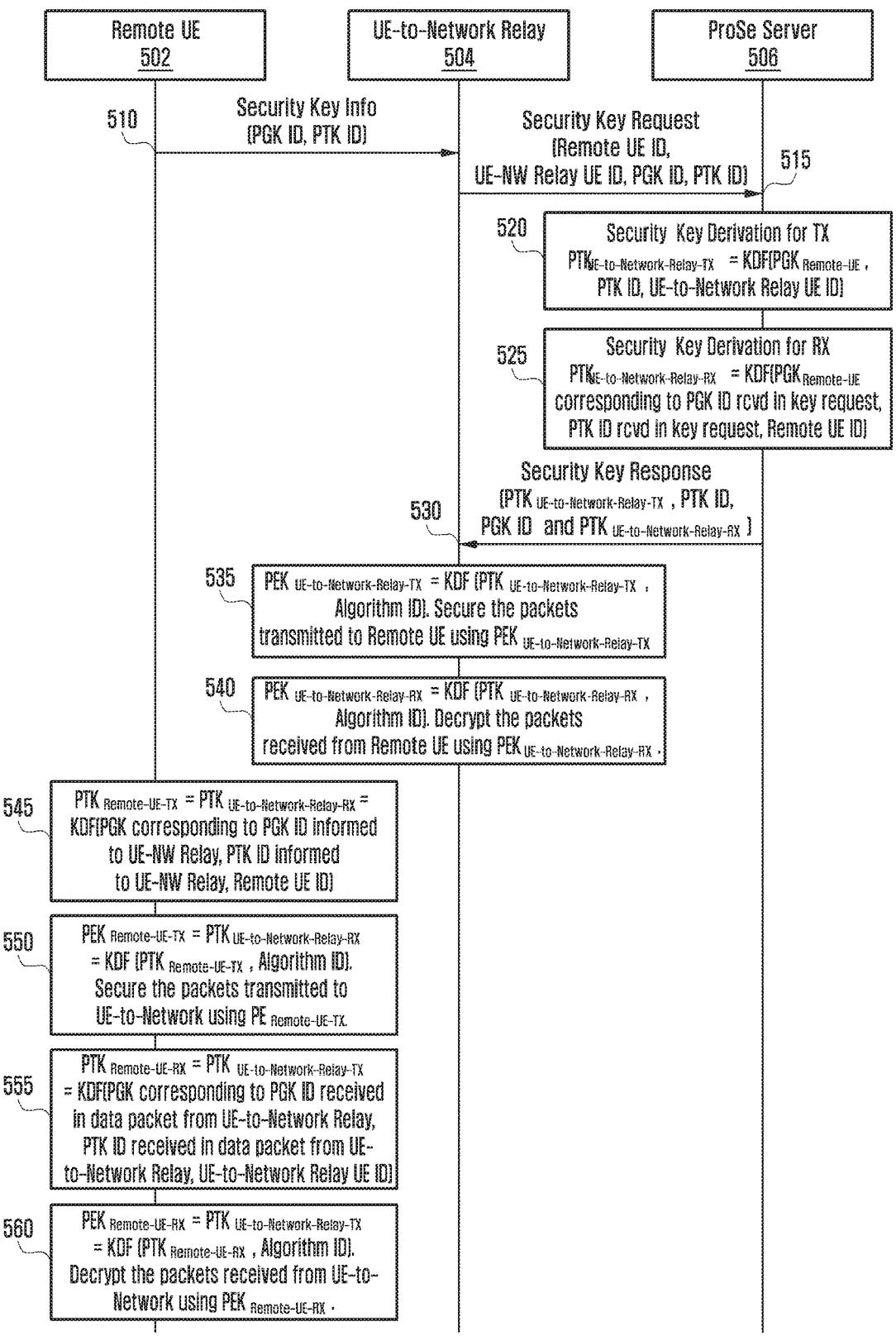
FIG. 5 is a flow diagram illustrating a method for establishing a secure communication between remote UE and UE-to-network relay according to an embodiment of the present disclosure.

FIG. 5 is a flow diagram illustrating a method for establishing a secure communication between a remote UE and a UE-to-network relay according to an embodiment of the present disclosure.

Referring to FIG. 5, a remote UE 502 transmits security key information comprising the PGK ID and the PTK ID to a UE-to-network relay 504 in operation 510. The PGK ID is the index of the PGK used by the remote UE 502 for deriving the security key ($PTK_{remote-UE}$). The remote UE 502 derives a PEK ($PEK_{remote-UE}$) from $PTK_{remote-UE}$. The $PEK_{remote-UE}$ is used by the remote UE 502 to secure the packets transmitted to UE-to-network relay 504.

After receiving the security key information from the remote UE 502, the UE-to-network relay 504 transmits a security key request to a ProSe server 506 or a PKMF in operation 515. The security key request comprises the remote UE ID, the UE-to-network relay's UE ID, the PGK ID received from remote UE, and the PTK ID received from remote UE 502. In various embodiments, the remote UE group ID may be included in the security key request if the remote UE 502 belongs to multiple groups. In various embodiments, the remote UE group ID may also be included in the security key request if the remote UE ID is unique within the group. If the remote UE ID is unique only within the group, then the remote UE ID and the remote UE group ID together identify the remote UE. The UE-to-network relay 504 obtains the remote UE ID and/or the remote UE group ID of the remote UE 502 during the UE-to-network relay discovery process. Alternately, the UE-to-network relay 504 may receive the remote UE ID and/or the remote UE group ID of the remote UE 502 from the remote UE 502 in the communication or connection request message. The UE-to-network relay 504 may transmit a security key request to a ProSe server 506 or the PKMF upon receiving the communication or connection request message from remote UE 502.

The ProSe server 506 or the PKMF, in operation 520, derives a first security key (i.e., PTK 1), which is used by the UE-to-network relay 504 to secure the packets transmitted to the remote UE 502 or the remote UE's group where the derivation of the security key is as follows:

$PTK_{UE-to-network-relay-TX}$=KDF($PGK_{remote-UE}$,PTK ID,UE-to-network relay UE ID).

The $PGK_{remote-UE}$ is any valid PGK of the remote UE 502 if the remote UE 502 is associated with one group. The $PGK_{remote-UE}$ is any valid PGK of the remote UE corresponding to the group identified by the remote UE group ID.

In an embodiment, the ProSe server 506 or the PKMF may derive the $PEK_{UE-to-network-relay-TX}$, wherein the $PEK_{UE-to-network-relay-TX}$=KDF ($PTK_{UE-to-network-relay-TX}$, algorithm ID) and wherein the algorithm ID identifies the security algorithm for example, SNOW 3G integrity algorithm or AES encryption algorithm.

The ProSe server 506 or the PKMF, in operation 525, further derives a second security key (i.e., PTK 2) to be used by the UE-to-network relay 504 to decrypt the packets received from the remote UE 502 or remote UE's group. The derivation of PTK 2 is as follows:

$PTK_{UE-to-network-relay-RX}$=KDF($PGK_{remote-UE}$,PTK ID,remote UE ID).

Where $PGK_{remote-UE}$ is the PGK of the remote UE 502 corresponding to PGK ID received from UE-to-network relay in security key request. The PTK ID is the PTK ID received from UE-to-network relay in security key request. In an embodiment, the ProSe server or the PKMF may derive $PEK_{UE-to-network-relay-RX}$ wherein, $PEK_{UE-to-network-relay-RX}$=KDF ($PTK_{UE-to-network-relay-RX}$,algorithm ID)

in which the algorithm ID identifies the security algorithm, for example, SNOW 3G integrity algorithm or AES encryption algorithm.

The ProSe server 506 or the PKMF then transmits the security key response to the UE-to-network relay 504 in operation 530. The security key response comprises the $PTK_{UE-to-network-relay-TX}$, the PTK ID, the PGK ID and the $PTK_{UE-to-network-relay-RX}$, where the $PTK_{UE-to-network-relay-TX}$ is the security derived by the ProSe server 506 or the PKMF which is used by the UE-to-network relay 504 to secure the packets transmitted to the remote UE 502. The PTK ID is the ID used as input to derive the $PTK_{UE-to-network-relay-TX}$. The PGK ID is the index of the $PGK_{remote-UE}$ used to derive the $PTK_{UE-to-network-relay-TX}$. The $PTK_{UE-to-network-relay-RX}$ is the security derived by the ProSe server 506 or the PKMF which is used by the UE-to-network relay 504 to decrypt the packets received from the remote UE 502. In an embodiment, the $PEK_{UE-to-network-relay-TX}$ and the $PEK_{UE-to-network-relay-RX}$ is included in security key response instead of/or along with the $PTK_{UE-to-network-relay-TX}$ and the $PTK_{UE-to-network-relay-RX}$.

The UE-to-network relay 504 generates two keys, one for secure transmission of data packets to remote UE 502 and another for secure reception of data packets from the remote UE 502. The UE-to-network relay 504, in operation 535, generates a secure transmission key, ($PEK_{UE-to-network-relay-TX}$) using the $PTK_{UE-to-network-relay-TX}$ received in the security key response from the ProSe server 506 or the PKMF wherein $PEK_{UE-to-network-relay-TX}$=KDF ($PTK_{UE-to-network-relay-TX}$,algorithm ID)

The $PEK_{UE-to-network-relay-TX}$ is then used for securing the packets transmitted to the remote UE 502. In an embodiment, the $PEK_{UE-to-network-relay-TX}$ is received in the security key response from the ProSe server 506 or the PKMF and is used by the UE-to-network relay 504 for securing the packets transmitted to the remote UE 502. Further, the PTK ID and the PGK ID received from the ProSe server 506 or the PKMF in the security key response are transmitted by UE-to-network relay 504 in header of the secured data packets.

The UE-to-network relay 504, in operation 540, generates the $PEK_{UE-to-network-relay-RX}$ using the $PTK_{UE-to-network-relay-RX}$ received in the security key response from the ProSe server 506 or the PKMF wherein $PEK_{UE-to-network-relay-RX}$=KDF ($PTK_{UE-to-network-relay-RX}$,algorithm ID)

The $PEK_{UE-to-network-relay-RX}$ is then used for decrypting the packets received from the remote UE 502. In an embodiment, $PEK_{UE-to-network-relay-RX}$ is received in the security key response from the ProSe server 506 or the PKMF and is used by the UE-to-network relay 504 for decrypting the packets received from the remote UE 502.

The remote UE generates the security keys internally. The keys are generated before sending the security key info to the UE-to-network relay 504. The remote UE 502 first generates a security key (i.e., PTK) for transmission to the UE-to-network relay 504 in operations 545 and 550. The security key is derived as follows:

$$PTK_{remote-UE-TX}=KDF(PGK \text{ corresponding to PGK} \\ \text{ID informed to UE-to-network relay,PTK ID} \\ \text{informed to UE-to-network relay and remote} \\ \text{UE ID)}$$

$$PEK_{remote-UE-TX}=KDF(PEK_{remote-UE-TX}, \text{algorithm ID})$$

The $PEK_{remote-UE-TX}$ is used by the remote UE 502 for securing the packets transmitted to the UE-to-network relay 504.

The remote UE 502 generates a security key (i.e., PTK) for decrypting reception from the UE-to-network relay 504 in operations 555 and 560. The security key is derived as follows:
$PTK_{remote-UE-RX}$=KDF (PGK corresponding to PGK ID received in data packet from the UE-to-network relay 504, the PTK ID received in data packet from the UE-to-network relay 504, the UE-to-network relay UE ID)

$$PEK_{remote-UE-RX}=KDF(PEK_{remote-UE-RX}, \text{algorithm ID})$$

where $PEK_{remote-UE-RX}$ is used by the remote UE 502 for decrypting the packets received from the UE-to-network relay 504.

In an embodiment, the remote UE ID may be used in place of the UE-to-network relay UE ID in deriving $PTK_{UE-to-network-relay-TX}$ and the $PTK_{remote-UE-RX}$. In an embodiment, the remote UE ID may be used in addition to the UE-to-network relay UE ID in deriving the $PTK_{UE-to-network-relay-TX}$ and the $PTK_{remote-UE-RX}$.

Figure 6:
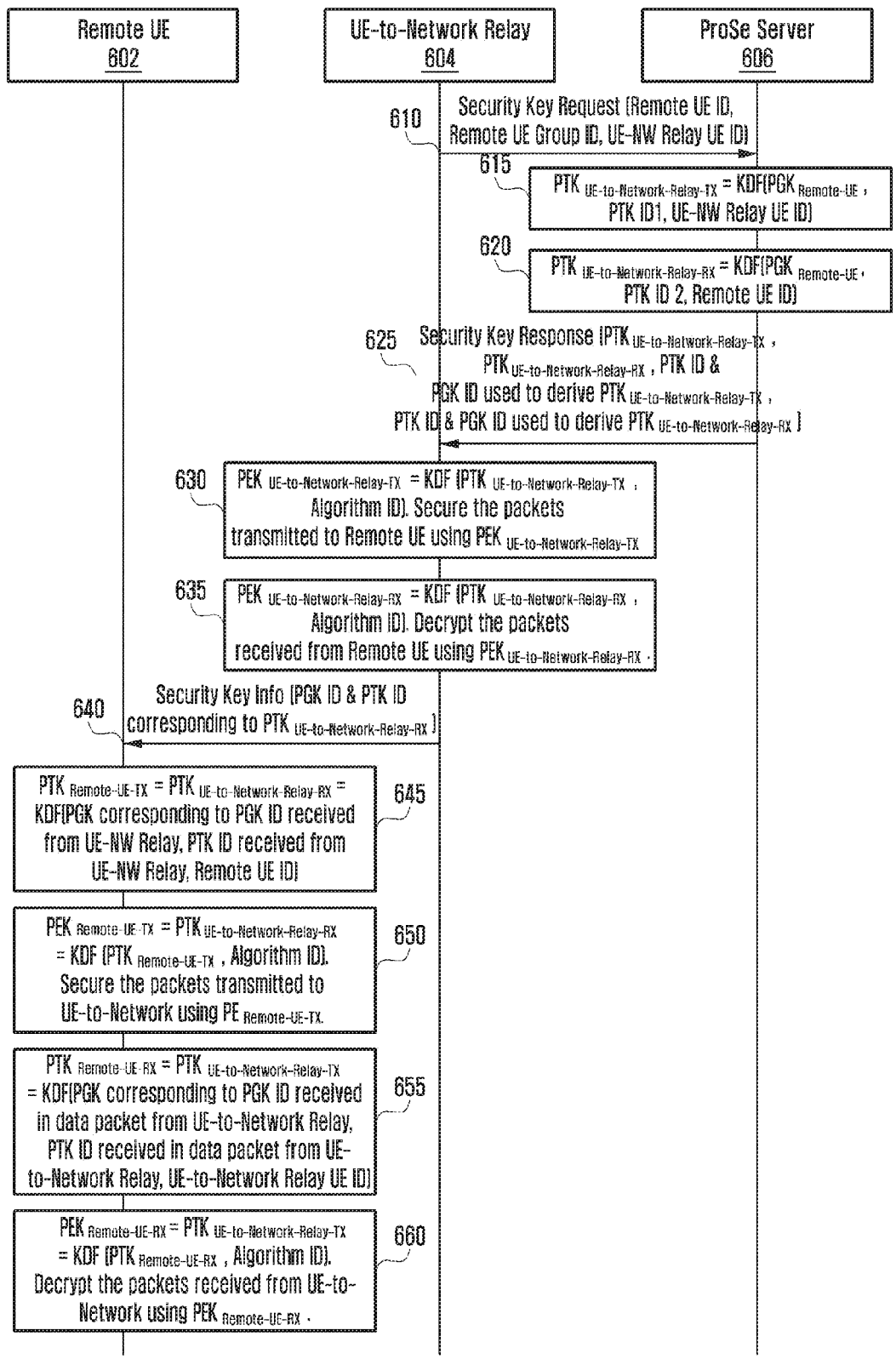
FIG. 6 is a flow diagram illustrating a method for establishing a secure communication between remote UE and UE-to-network relay according to an embodiment of the present disclosure.

FIG. 6 is a flow diagram illustrating a method for establishing a secure communication between a remote UE and a UE-to-network relay according to an embodiment of the present disclosure.

Referring to FIG. 6, a UE-to-network relay 604 transmits a security key request to a ProSe server 606 or a PKMF in operation 610. The security key request comprises a remote UE ID and a UE-to-network relay's UE ID. The security key request may also comprise a remote UE group ID. In various embodiments, the remote UE group ID may be included in the security key request, if a remote UE 602 belongs to multiple groups. In various embodiments, the remote UE group ID may also be included in the security key request if the remote UE ID is unique within the group. If remote UE ID is unique only within the group, the remote UE ID and the remote UE group ID together identify the remote UE 602. In an embodiment, the UE-to-network relay 604 obtains the remote UE ID and/or remote UE group ID of the remote UE 602 during the UE-to-network relay 604 discovery process. Alternately, the UE-to-network relay 604 may receive the remote UE ID and/or remote UE group ID of the remote 602 from the remote UE 602 in the communication or connection request message. The UE-to-network relay 604 may transmit a security key request to a ProSe server 606 or the PKMF on receiving the communication or connection request message from remote UE 602.

The ProSe server 606 or the PKMF derives a first security key (i.e., PTK 1) which is used by the UE-to-network relay 604 to secure data packets transmitted to the remote UE 602 or the remote UE's group in operation 615. The ProSe server 606 or the PKMF derives the security key as follows:

$$PTK_{UE-to-network-relay-TX}=KDF(PGK_{remote-UE},PTK \\ \text{ID1,UE-to-network relay604UE ID)}$$

where, the $PGK_{remote-UE}$ is any valid PGK of the remote UE 602 if the remote UE 602 is associated with one group. The $PGK_{remote-UE}$ is any valid PGK of the remote UE 602 corresponding to the group identified by the remote UE group ID. In an embodiment, the ProSe server 606 or the PKMF may derive $PEK_{UE-to-network-relay-TX}$ wherein $$PEK_{UE-to-network-relay-TX}=KDF \\ (PTK_{UE-to-network-relay-TX}, \text{algorithm ID})$$

where, the algorithm ID identifies the security algorithm, for example, a SNOW 3G integrity algorithm or an AES encryption algorithm.

The ProSe server 606 or the PKMF further derives a second security key (i.e., PTK 2) which is used by the UE-to-network relay 604 to decrypt the packets received from the remote UE 602 in operation 620. The ProSe server 606 or the PKMF derives the security key as follows:

$$PTK_{UE-to-network-relay-RX}=KDF(PGK_{remote-UE},PTK \\ \text{ID2,remote UE ID)},$$

where, the $PGK_{remote-UE}$ is any valid PGK of the remote UE 602 if the remote UE 602 is associated with one group. The $PGK_{remote-UE}$ is any valid PGK of the remote UE 602 corresponding to the group identified by the remote UE group ID. In an embodiment, the ProSe server 606 or the PKMF may derive $PEK_{UE-to-network-relay-RX}$ wherein $$PEK_{UE-to-network-relay-RX}=KDF \\ (PTK_{UE-to-network-relay-RX}, \text{algorithm ID})$$

The algorithm ID identifies the security algorithm, for example, a SNOW 3G integrity algorithms or an AES encryption algorithm.

The ProSe server 606 or the PKMF transmits the security key response to the UE-to-network relay 604 at in operation 625. The security key response comprises the $PTK_{UE-to-network-relay-TX}$, PGK ID and the PTK ID used to derive the $PTK_{UE-to-network-relay-TX}$, the $PTK_{UE-to-network-relay-RX}$, the PGK ID and the PTK ID used to derive the $PTK_{UE-to-network-relay-RX}$. The $PTK_{UE-to-network-relay-TX}$ is the security key derived by the ProSe server 606 or the PKMF which is to be used by the UE-to-network relay 604 to secure the packets transmitted to the remote UE 602. The PTK ID is the ID used as input to derive the $PTK_{UE-to-network-relay-TX}$. The PGK ID is the index of the $PGK_{remote-UE}$ used to derive the $PTK_{UE-to-network-relay-TX}$. The $PTK_{UE-to-network-relay-RX}$ is the security derived by the ProSe server 606 or the PKMF which is used by the UE-to-network relay 604 to decrypt the packets received from the remote UE 602. In an embodiment, the $PEK_{UE-to-network-relay-TX}$ and the $PEK_{UE-to-network-relay-RX}$ are included in security key response instead of or along with the $PTK_{UE-to-network-relay-TX}$ and the $PTK_{UE-to-network-relay-RX}$.

The UE-to-network relay 604, in operation 630, generates the $PEK_{UE-to-network-relay-TX}$ using the $PTK_{UE-to-network-relay-TX}$ received in the security key response from the ProSe server 606 or the PKMF wherein $$PEK_{UE-to-network-relay-TX}=KDF \\ (PTK_{UE-to-network-relay-TX}, \text{algorithm ID})$$

The $PEK_{UE-to-network-relay-TX}$ is then used for securing the packets transmitted to the remote UE 602. In an embodiment, the $PEK_{UE-to-network-relay-TX}$ is received in the security key response from the ProSe server 606 or the PKMF and is used by the UE-to-network relay 604 for securing the packets transmitted to the remote UE. Later, the PTK ID and the PGK ID received from the ProSe server 606 or the PKMF in security key response are transmitted by the UE-to-network relay 604 in header of secured data packets.

The UE-to-network relay 604, in operation 635, further generates a $PEK_{UE\text{-}to\text{-}network\text{-}relay\text{-}RX}$ using the $PTK_{UE\text{-}to\text{-}network\text{-}relay\text{-}RX}$ received in the security key response from the ProSe server 606 or the PKMF wherein $PEK_{UE\text{-}to\text{-}network\text{-}relay\text{-}RX}$=KDF
($PTK_{UE\text{-}to\text{-}network\text{-}relay\text{-}RX}$,algorithm ID)

The $PEK_{UE\text{-}to\text{-}network\text{-}relay\text{-}RX}$ is then used for decrypting the packets received from the remote UE 602. In an embodiment, the $PEK_{UE\text{-}to\text{-}network\text{-}relay\text{-}RX}$ is received in the security key response from the ProSe server 606 or the PKMF and is used by the UE-to-network relay 604 for decrypting data packets received from the remote UE 602. The PTK ID and the PGK ID received from the ProSe server 606 or the PKMF in security key response corresponding to the $PTK_{UE\text{-}to\text{-}network\text{-}relay\text{-}RX}$ are transmitted by the UE-to-network relay 604 in security key information in operation 640.

The remote UE 602 generates the security key (i.e., PTK) for transmission to the UE-to-network relay 604 in operation 645 and 650. The security key is derived as follows:

$PTK_{remote\text{-}UE\text{-}TX}$=KDF(PGK corresponding to the
   PGK ID received from the UE-to-network relay
   604, the PTK ID received from the UE-to-net-
   work relay 604 and the remote UE ID)

$PEK_{remote\text{-}UE\text{-}TX}$=KDF($PEK_{remote\text{-}UE\text{-}TX}$,algorithm ID)

The $PEK_{remote\text{-}UE\text{-}TX}$ is used by the remote UE 602 for securing data packets to be transmitted to the UE-to-network relay 604.

Further, the remote UE 602 generates the security key (i.e., PTK) for decrypting reception from the UE-to-network relay 604 in operation 655 and 660. The security key is derived as follows:

$PTK_{remote\text{-}UE\text{-}RX}$=KDF(the PGK corresponding to the
   PGK ID received in a data packet from the UE-
   to-network relay 604,the PTK ID received in
   data packet from the UE-to-network relay 604,
   the UE-to-network relay UE ID).

$PEK_{remote\text{-}UE\text{-}RX}$=KDF($PEK_{remote\text{-}UE\text{-}RX}$,algorithm
   ID).

The $PEK_{remote\text{-}UE\text{-}RX}$ is used by the remote UE 602 for decrypting data packets received from the UE-to-network relay 604.

In an embodiment, the remote UE ID may be used in place of the UE-to-network relay 604 UE ID in deriving the $PTK_{UE\text{-}to\text{-}network\text{-}relay\text{-}TX}$ and the $PTK_{remote\text{-}UE\text{-}RX}$. In an embodiment, the remote UE ID may be used in addition to the UE-to-network relay 604 UE ID in deriving security keys for transmission and reception ($PTK_{UE\text{-}to\text{-}network\text{-}relay\text{-}TX}$ and $PTK_{remote\text{-}UE\text{-}RX}$).

FIG. 7 is a flow diagram illustrating a method for establishing a secure communication between a remote UE and a UE-to-network relay according to an embodiment of the present disclosure.

Referring to FIG. 7, a UE-to-network relay 704 transmits a security key request to a ProSe server 706 or a PKMF in operation 710. The security key request comprises a remote UE ID and a UE-to-network relay's UE ID. In various embodiments, the remote UE group ID may be included in the security key request if a remote UE 702 belongs to multiple groups. In various embodiments, the remote UE group ID may also be included in the security key request if the remote UE ID is unique within the group. If the remote UE ID is unique only within the group, then the remote UE ID and the remote UE group ID together identify the remote UE 702. The UE-to-network relay 704 may also obtain the remote UE ID and/or the remote UE group ID of the remote UE 702 during a UE-to-network relay discovery process. Alternately, the UE-to-network relay 704 may receive the remote UE ID and/or the remote UE group ID of the remote UE 702 from the remote UE 702 in a connection request procedure.

The ProSe server 706 or the PKMF derives the security key (i.e., PTK) which is used to secure communication between the remote UE 702 and the UE-to-network relay 704 in operation 720. The ProSe server 706 or the PKMF derives the security key as follows:

PTK=KDF(security key of the remote UE,COUN-
   TER and/or NONCE and/or remote UE ID and/
   or UE-to-network relay UE ID), where the security key of the remote UE 702 is a UE specific key known to the remote UE 702 and the ProSe server 706 or the PKMF. In an embodiment, the security key is a master key ($K_{ASME}$) obtained from a home subscriber server (HSS) by the ProSe server 706 or by the PKMF specific to the UE. The $K_{ASME}$ is provided to the ProSe server 706 or the PKMF along with an authentication vector. In an embodiment, the ProSe server 706 or the PKMF transmits an AUTN and RAND along with the PTK/PEK to the UE-to-network relay 704. The UE-to-network relay 704 forwards the AUTN and RAND to the remote UE 702, so that the remote UE 702 derives the $K_{ASME}$ and other keys. In an embodiment, ProSe server 706 or the PKMF may derive PEK wherein PEK=KDF(PTK,algorithm ID)

The algorithm ID identifies the security algorithm, for example, a SNOW 3G integrity algorithms or an AES encryption algorithm. The algorithm to be used may be pre-configured in the remote UE 702 by the ProSe server 706 or the PKMF for the group or alternatively the data packets include the algorithm ID in the header. The ProSe server 706 or the PKMF transmits the security key response to the UE-to-network relay 704 in operation 730. The security key response comprises the PTK and a COUNTER and/or a NONCE. In an embodiment, the PEK is included in security key response instead of or along with the PTK.

The UE-to-network relay 704, in operation 740, generates a PEK using the PTK received in the security key response from the ProSe server 706 or the PKMF wherein PEK=KDF(PTK,algorithm ID)

The PEK is then used for decrypting the packets received from the remote UE 702 and also to encrypt the packets transmitted to the remote UE 702. In an embodiment, the PEK is received in the security key response from the ProSe server 706 or the PKMF and is used by the UE-to-network relay 704 for decrypting the packets received from remote UE 702 and also to encrypt the packets transmitted to the remote UE 702. The COUNTER and/or the NONCE received from the ProSe server 706 or the PKMF in the security key response corresponding to the PTK are transmitted in operation 750 by the UE-to-network relay 704 in a data packet header or a signaling message.

The remote UE 702 generates the security key (i.e., PTK) for transmission to the UE-to-network relay 704 in operations 760 and 770. The security key is derived as follows:

PTK=KDF(security key of the remote UE,COUN-
   TER and/or NONCE received from UE-to-net-
   work relay and/or remote UE ID and/or UE-to-
   network relay UE ID)

PEK=KDF(PEK,algorithm ID), where $PEK_{remote-UE-TX}$ is used by the remote UE 702 for securing the packets transmitted to the UE-to-network relay 704 and for decrypting the packets received from the UE-to-network relay 704.

In an embodiment, the ProSe server 706 or the PKMF may derive two PTKs instead of one wherein one is used for securing the packets transmitted by the UE-to-network relay 704 and another is used for securing the packets transmitted by the remote UE 702. The UE-to-network relay 704 further contacts the ProSe server 706 or the PKMF in case of any key refresh/key update. For the key refresh/update, the UE-to-network relay 704 transmits the current PTK ID and/or all the PTK IDs used for the group to the ProSe server 706 or the PKMF for obtaining fresh key(s).

In an embodiment, a method for establishing a secure communication between the remote UE 702 and the UE-to-network relay 704 in a D2D communication is explained as follows.

The ProSe server 706 or the PKMF assigns one or more of the PRGKs to the UE-to-network relay 704. The PRGKs are assigned in addition to assignment of the PGKs corresponding to the PRKGs affiliated group(s). Further, the ProSe server 706 or the PKMF also assigns one or more of the PRGKs to the remote UE 702 in addition to the assignment of the PGKs corresponding to its affiliated group(s).

Using the PRGKs associated with the remote UE 702, the remote UE 702 derives security key for encrypting the data packets transmitted to UE-to-network relay 704 as follows:

PRTK=KDF(PRGK,PRTK ID,remote UE ID).

PREK=KDF(PRTK,algorithm ID)

The algorithm ID identifies the security algorithm, for example, a SNOW 3G integrity algorithms or an AES encryption algorithm. The algorithm to be used may be pre-configured in the remote UE by the ProSe server for the group or alternatively the data packets include the algorithm ID in the header. A PREK is used by remote UE for encrypting the data packets transmitted to the UE-to-network relay 704. Further, a PRGK ID corresponding to the PRGK and the PRTK ID are transmitted along with encrypted data packet in data packet header.

Similarly, the UE-to-network relay 704 derives the security key for encrypting the data packets transmitted to remote UE 702 as follows:

PRTK=KDF(PRGK,PRTK ID,UE-to-network relay UE ID).

PREK=KDF(PRTK,algorithm ID)

In the above, the algorithm ID identifies the security algorithm, for example, a SNOW 3G integrity algorithms or an AES encryption algorithm. The algorithm to be used may be pre-configured in the UE-to-network relay 704 by the ProSe server 706 for the group or alternatively the data packets include the algorithm ID in the header. The PREK is used by the UE-to-network relay 704 for encrypting the data packets transmitted to the remote UE 702, The PRGK ID corresponding to the PRGK and the PRTK ID are transmitted along with encrypted data packet in data packet header.

In all the embodiments, the security mechanisms are applied to the data packets which are relayed by the UE-to-network relay 704. The UE-to-network relay 704 may determine using the protocol data unit (PDU) type field in the packet data convergence protocol (PDCP) header whether the packet is to be relayed or not. Similarly, the remote UE 702 may determine using the PDU type field in the PDCP header whether the packet received is relayed by the UE-to-network relay 704 or not. Alternately, logical channel ID may be used to indicate relay of data packets.

It should be noted that the embodiments of the present disclosure may be applied to communication between any UE1 (instead of the remote UE) and UE2 (instead of the UE-to-network relay). The $PGK_{remote\ UE}$ used in the present disclosure may be UE1's master key instead of the group key.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method by a node for establishing a secure communication between a user equipment (UE) and a relay UE, the method comprising:
   deriving a proximity-based service (ProSe) traffic key (PTK) of the relay UE by using a key derivation function (KDF) determined based on a ProSe group key (PGK) of the UE, a PTK identification (ID) and an ID of the relay UE; and
   transmitting a security key response message including the PTK of the relay UE, the PTK ID and PGK ID, to the relay UE,
   wherein the PTK of the relay UE, the PTK ID and the PGK ID are used to derive a security key for a device to device (D2D) communication between the UE and the relay UE.

2. The method of claim 1, wherein the PGK of the UE is a valid PGK of the UE corresponding to a group identified by a group ID of the UE.

3. The method of claim 1, further comprising:
   receiving, before deriving the PTK of the relay UE, a security key request message including an ID of the UE and the ID of the relay UE, from the relay UE.

4. A method by a relay user equipment (UE) for establishing a secure communication between a UE and the relay UE, the method comprising:
   receiving a security key response message including a proximity-based service (ProSe) traffic key (PTK) of the relay UE, a PTK identification (ID) and a ProSe group key (PGK) ID, from a node;
   generating a ProSe encryption key (PEK) of the relay UE based on the PTK of the relay UE; and
   transmitting, an authentication request message including the PGK ID and the PTK ID, to the UE,
   wherein the PGK ID and the PTK ID are used to derive a security key for a device to device (D2D) communication between the UE and the relay UE.

5. The method of claim 4, further comprising:
   encrypting a packet to transmit to the UE using the PEK of the relay UE; and
   transmitting the encrypted packet to the UE.

6. The method of claim 4, further comprising:
   decrypting packets received from the UE using the PEK of the relay UE.

7. The method of claim 4, further comprising:
   transmitting, before receiving the security key response message, a security key request message including an ID of the UE and an ID of the relay UE, to the node.

8. A method by a user equipment (UE) for establishing a secure communication between a UE and a relay UE, the method comprising:

receiving, an authentication request message including a proximity-based service (ProSe) group key (PGK) identification (ID) and a ProSe traffic key (PTK) ID, from the relay UE;

deriving a PTK of the UE from a key derivation function (KDF) determined based on the PGK corresponding to the PGK ID and a group ID of the UE, the PTK ID, and an ID of relay UE; and deriving a ProSe encryption key (PEK) of the UE from the KDF determined based on the PTK of the UE and an algorithm ID, wherein the PGK ID and the PTK ID are used to derive a security key for a device to device (D2D) communication between the UE and the relay UE.

9. The method of claim 8, further comprising:
encrypting a packet to transmit to the relay UE using the PEK of the UE; and
transmitting the encrypted packet to the relay UE.

10. The method of claim 8, further comprising:
decrypting packets received from the relay UE using the PEK of the UE.

11. A node for establishing a secure communication between a user equipment (UE) and a relay UE, the node comprising:
a transceiver configured to transmit and receive signals; and
at least one processor configured to:
derive proximity-based service (ProSe) traffic key (PTK) of the relay UE by using key derivation function (KDF) determined based on a ProSe group key (PGK) of the UE, a PTK identification (ID) and a ID of the relay UE, and
transmit a security key response message including the PTK of the relay UE, the PTK ID and PGK ID, to the relay UE,
wherein the PTK of the relay UE, the PTK ID and the PGK ID are used to derive security key for a device to device (D2D) communication between the UE and the relay UE.

12. The node of claim 11, wherein the PGK of the UE is a valid PGK of the UE corresponding to a group identified by a group ID of the UE.

13. The node of claim 11, wherein the at least one processor is further configured to:
receive, before deriving the PTK of the relay UE, a security key request message including an ID of the UE and the ID of the relay UE, from the relay UE.

14. A relay user equipment (UE) for establishing a secure communication between a UE and the relay UE, the relay UE comprising:
a transceiver configured to transmit and receive signals; and
at least one processor configured to:
receive a security key response message including a proximity-based service (ProSe) traffic key (PTK) of the relay UE, a PTK identification (ID) and a ProSe group key (PGK) ID, from a node,
generate a ProSe encryption key (PEK) of the relay UE based on the PTK of the relay UE, and
transmit an authentication request message including the PGK ID and the PTK ID to the UE,
wherein the PGK ID and the PTK ID are used to derive a security key for a device to device (D2D) communication between the UE and the relay UE.

15. The relay UE of claim 14, wherein the at least one processor is further configured to:
encrypt a packet to transmit to the UE using the PEK of the relay UE; and
transmit the encrypted packet to the UE.

16. The relay UE of claim 14, wherein the at least one processor is further configured to:
decrypt packets received from the UE using the PEK of the relay UE.

17. The relay UE of claim 14, wherein the at least one processor is further configured to:
transmit, before receiving the security key response message, a security key request message including an ID of the UE and an ID of the relay UE, to the node.

18. A user equipment (UE) for establishing a secure communication between a UE and a relay UE, the UE comprising:
a transceiver configured to transmit and receive signals; and
at least one processor configured to:
receive an authentication request message including a proximity-based service (ProSe) group key (PGK) identification (ID) and a ProSe traffic key (PTK) ID, from the relay UE;
derive a PTK of the UE from a key derivation function (KDF) determined based on the PGK corresponding to the PGK ID and a group ID of the UE, the PTK ID, and an ID of relay UE; and
derive a ProSe encryption key (PEK) of the UE from a KDF determined based on the PTK of the UE and an algorithm ID,
wherein the PGK ID and the PTK ID are used to derive a security key for a device to device (D2D) communication between the UE and the relay UE.

19. The UE of claim 18, wherein the at least one processor is further configured to:
encrypt a packet to transmit to the relay UE using the PEK of the UE; and
transmit the encrypted packet to the relay UE.

20. The UE of claim 18, wherein the at least one processor is further configured to:
decrypt packets received from the relay UE using the PEK of the UE.

21. The method of claim 1, wherein the PTK of the relay UE is derived, when the PGK of the UE is not available with the relay UE.

22. The method of claim 4, wherein the security key response message is received, when the PGK of the UE is not available with the relay UE.

23. The method of claim 8, wherein the authentication request message is received, when the PGK of the UE is not available with the relay UE.

24. The node of claim 11, wherein the at least one processor further configured to derive the PTK of the relay UE, when the PGK of the UE is not available with the relay UE.

25. The relay UE of claim 14, wherein the at least one processor further configured to receive the security key response message, when the PGK of the UE is not available with the relay UE.

26. The UE of claim 18, wherein the at least one processor is further configured to receive the authentication request message, when the PGK of the UE is not available with the relay UE.

* * * * *